F. M. BIRDSALL.
Wheel-Cultivator.

No. 54,842.

Patented May 22, 1866.

WITNESSES:

INVENTOR:
Francis M. Birdsall

UNITED STATES PATENT OFFICE.

FRANCIS M. BIRDSALL, OF MARTINSVILLE, OHIO.

IMPROVEMENT IN FURROWING-MACHINES.

Specification forming part of Letters Patent No. 54,842, dated May 22, 1866; antedated May 16, 1866.

*To all whom it may concern:*

Be it known that I, FRANCIS M. BIRDSALL, of Martinsville, Clinton county, and State of Ohio, have invented a new and useful Improvement in Furrowing-Out Machines, of which the following is a full and clear description, reference being had to the accompanying drawings, forming part of this specification.

My invention relates to a simple device by means of which the plows may be drawn toward the center of the machine when it is necessary to pass through a narrow passage-way, and also to secure the plow above the ground.

Figure 1:
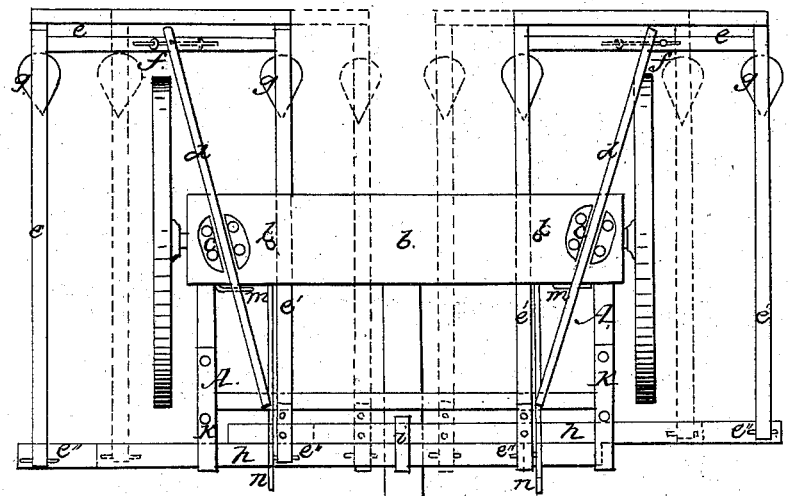
Figure 2:
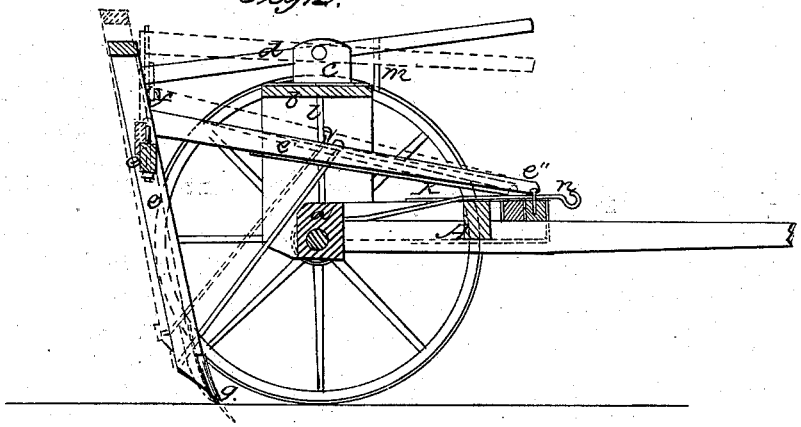

Figure 1 in the accompanying drawings is a plan of my improved furrowing-out machine. Fig. 2 is an elevation of my improved machine.

A represents the frame of the machine, which is secured to axle-tree $a$ by means of two standards, which are secured to axle-tree $a$.

$b$ is the seat. At either end of seat $b$ are boxes $c$, in which are pivoted the levers $d$. Levers $d$ are attached to the plow-frames $e$ by chains or other flexible material $f$. A series of furrowing-plows, $g$, are attached to the lower extremity of plow-frames $e$.

The longitudinal strips $e'$ of frames $e$ are hinged at their forward ends, $e''$, to sliding strips $h$, which move freely side by side upon the top of the frame and tongue of the machine. They are held in place by the central strap, $i$, which is made fast to the tongue and side strips, $k$, which are attached to frame A.

Rods $l$ prevent from spreading the frame $e$. Check-bars $m$ are designed to secure the levers $d$ when plow-frames $e$ are elevated at their back ends, in order to throw the plows $g$ out of and above the ground. $n$ are drag-bars to which double-trees or single-trees may be attached.

Operation: When it is necessary, on account of obstructions or during the disuse, the plow may be removed from and above the ground by depressing the front end of levers $d$, which are secured by passing over them the check-bars $m$.

In furrowing out for the planting of corn or other grain, the plows are equidistant. The plow-frames are prevented from too great lateral spreading by rods $l$. When it is necessary to pass the machine through a narrow gateway the plow-frames may be pushed in toward the center of the machine, as shown in Fig. 1, contracting the width of the machine within the usual limits.

Having fully described my furrowing-out machine and the operation of its various parts, I make the following claim:

The plow-frames $e$, longitudinal strips $e'$, and levers $d$, in combination with plows $g$, frame A, and sliding strips $h$, constructed as above described, and for the purposes set forth.

FRANCIS M. BIRDSALL.

Attest:
 CARLO PIEPHO,
 WM. HUGHT.